US010773505B2

United States Patent
Kim et al.

(10) Patent No.: US 10,773,505 B2
(45) Date of Patent: Sep. 15, 2020

(54) METHOD OF ATTACHING SUBSTRATE AND APPARATUS FOR ATTACHING SUBSTRATE

(71) Applicant: Samsung Display Co., Ltd., Yongin-si (KR)

(72) Inventors: Taejin Kim, Busan (KR); Sukju Kang, Suwon-si (KR); Sangcheol Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 55 days.

(21) Appl. No.: 16/252,677

(22) Filed: Jan. 20, 2019

(65) Prior Publication Data

US 2019/0322092 A1    Oct. 24, 2019

(30) Foreign Application Priority Data

Apr. 19, 2018 (KR) .................. 10-2018-0045501

(51) Int. Cl.
| | | |
|---|---|---|
| *B32B 37/00* | (2006.01) | |
| *B32B 38/10* | (2006.01) | |
| *B32B 38/00* | (2006.01) | |
| *B32B 37/12* | (2006.01) | |
| *B32B 38/18* | (2006.01) | |
| *H01L 21/67* | (2006.01) | |
| *H01L 21/683* | (2006.01) | |

(52) U.S. Cl.
CPC ........ *B32B 37/025* (2013.01); *B32B 38/0008* (2013.01); *B32B 38/10* (2013.01); *B32B 2457/20* (2013.01)

(58) Field of Classification Search
USPC ................................. 156/247, 249
See application file for complete search history.

(56) References Cited

U.S. PATENT DOCUMENTS

| | | | | |
|---|---|---|---|---|
| 7,065,900 B2 * | 6/2006 | Park | .................. | H01L 21/67028 34/361 |
| 8,500,260 B2 * | 8/2013 | Carlini | ................... | C09D 11/38 347/88 |
| 9,904,216 B2 * | 2/2018 | Yoshida | ............... | G03G 15/162 |
| 2005/0000110 A1 * | 1/2005 | Park | .................. | H01L 21/67028 34/236 |
| 2007/0287222 A1 | 12/2007 | Natsume | | |

(Continued)

FOREIGN PATENT DOCUMENTS

| | | |
|---|---|---|
| JP | 2007-0329283 | 12/2007 |
| KR | 10-2005-0068396 | 7/2005 |

(Continued)

*Primary Examiner* — Sing P Chan
(74) *Attorney, Agent, or Firm* — H.C. Park & Associates, PLC (57) ABSTRACT

A method of stably and precisely attaching substrates and an apparatus for stably and precisely attaching substrates, the method including: placing a substrate, attached with a release film, on a shuttle stage; peeling the release film from the substrate; a transferring unit lifting the substrate from the shuttle stage; a gas supplier spraying gas toward the substrate so that the substrate is convexly curved in a direction away from the gas supplier; the substrate transferred into a chamber by the transferring unit; placing the substrate on a main stage in the chamber; and attaching the substrate to an adherend.

24 Claims, 6 Drawing Sheets

(56) References Cited

U.S. PATENT DOCUMENTS

| | | | | |
|---|---|---|---|---|
| 2012/0103217 A1* | 5/2012 | Stowe | ............... | B41N 3/006 |
| | | | | 101/423 |
| 2012/0274710 A1* | 11/2012 | Carlini | ............... | C09D 11/38 |
| | | | | 347/88 |
| 2017/0139355 A1* | 5/2017 | Yoshida | ............... | G03G 15/162 |
| 2019/0322092 A1* | 10/2019 | Kim | ............... | B32B 38/0008 |

FOREIGN PATENT DOCUMENTS

| KR | 10-1459065 | 11/2014 |
|---|---|---|
| KR | 10-1612076 | 4/2016 |
| KR | 10-1688114 | 12/2016 |

\* cited by examiner

METHOD OF ATTACHING SUBSTRATE AND APPARATUS FOR ATTACHING SUBSTRATE

CROSS-REFERENCE TO RELATED APPLICATION

This application claims priority from and the benefit of Korean Patent Application No. 10-2018-0045501, filed on Apr. 19, 2018, which is hereby incorporated by reference for all purposes as if fully set forth herein.

BACKGROUND

Field

Exemplary embodiments of the present invention relate generally to a method of attaching substrates and, more specifically, to an apparatus for attaching substrates.

Discussion of the Background

Display devices may be classified into liquid crystal display ("LCD") devices, organic light emitting diode ("OLED") display devices, plasma display panel ("PDP") devices, electrophoretic display devices, or the like based on a light emitting scheme thereof.

In general, the display device includes a window, a display panel, and a plurality of functional films, each of which may be attached to an adjacent component. A release film may be attached to a surface of one of at least two objects to be attached so that the attachment process may proceed after the release film is removed. However, foreign matter, such as dust and debris, may be generated during the removal of the release film, and the foreign matter may reduce the precision of the attaching process.

If the precision of the attaching process is reduced, the adhesion between the objects to be attached may be reduced, and thus the reliability and display quality of the display device may be degraded. Accordingly, there is a demand for a method of stably and precisely attaching substrates and an apparatus for stably and precisely attaching substrates.

The above information disclosed in this Background section is only for understanding of the background of the inventive concepts, and, therefore, it may contain information that does not constitute prior art.

SUMMARY

Exemplary embodiments of the present invention provide a method of stably and precisely attaching substrates and an apparatus for stably and precisely attaching substrates to improve the reliability and display quality of the display device.

Additional features of the inventive concepts will be set forth in the description which follows, and in part will be apparent from the description, or may be learned by practice of the inventive concepts An exemplary embodiment of the invention discloses a method of attaching substrates including: placing a substrate, attached with a release film, on a shuttle stage; peeling the release film from the substrate; lifting the substrate from the shuttle stage by a transferring unit; spraying gas toward the substrate by a gas supplier so that the substrate is convexly curved in a direction away from the gas supplier; transferring the substrate into a chamber by the transferring unit; placing the substrate on a main stage in the chamber; and attaching the substrate to an adherend.

The substrate may include a base layer and an adhesive layer, and the transferring unit may not contact an upper surface of the adhesive layer.

In transferring the substrate into the chamber by the transferring unit, the substrate may be transferred in a curved state.

In placing the substrate on the main stage in the chamber, the substrate may contact the stage sequentially from a center portion of the substrate to an edge portion of the substrate.

In placing the substrate on the main stage in the chamber, the gas supplier may spray gas toward the substrate.

In placing the substrate on the main stage in the chamber, the substrate may be vacuum-adsorbed to the main stage through at least one hole defined in the main stage.

The main stage may include a center portion and a peripheral portion between the center portion and an edge, and the main stage may have a plurality of first holes located at the center portion and a plurality of second holes located at the peripheral portion.

In placing the substrate on the main stage in the chamber, the substrate may be vacuum-adsorbed through the plurality of first holes, and then vacuum-adsorbed through the plurality of second holes.

In placing the substrate on the main stage in the chamber, the substrate may be secured by an adsorption pad located at the first hole, and then vacuum-adsorbed through the plurality of second holes.

The transferring unit may include two transferring members disposed apart from each other with the substrate interposed therebetween.

In the gas supplier spraying gas toward the substrate so that the substrate is convexly curved in the direction away from the gas supplier, the two transferring members may move in directions approaching each other.

In placing the substrate on the main stage in the chamber, the two transferring members may move in directions away from each other.

In the substrate being transferred into the chamber by the transferring unit, the substrate may be vacuum-adsorbed to the transferring member through at least one hole defined in the transferring member.

The transferring unit may further include a support frame connected to the two transferring members, and each of the two transferring members may have an inclined surface opposing the support frame.

The method may further include performing a plasma process on the substrate, after peeling the release film from the substrate and before the transferring unit lifting the substrate from the shuttle stage.

The method may further include cleaning the substrate to which the release film is attached before peeling the release film from the substrate.

An exemplary embodiment of the invention also provides an apparatus for attaching substrates, including: a shuttle stage configured to support and transfer a substrate; a main stage located in a chamber; a transferring unit configured to transfer the substrate from the shuttle stage to the main stage; and a gas supplier disposed apart from the shuttle stage with the substrate interposed therebetween, the gas supplier spraying gas toward the substrate.

The substrate may include a base layer and an adhesive layer, and the transferring unit may not contact an upper surface of the adhesive layer.

The transferring unit may include a support frame and two transferring members, the two transferring members connected to the support frame and opposing each other, and each of the two transferring members may have an inclined surface opposing the support frame.

Each of the two transferring members may have a plurality of holes.

The gas supplier and the transferring unit may be integrally formed into a unitary structure.

The gas supplier may be disposed apart from the main stage with the substrate interposed therebetween, and sprays gas toward the substrate.

The main stage may have a plurality of holes.

The apparatus may further include an adsorption pad located at at least one of the plurality of holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further is understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath"

other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an apparatus for attaching substrates according to an embodiment of the present invention will be described with reference to FIG. 1.

Figure 1:
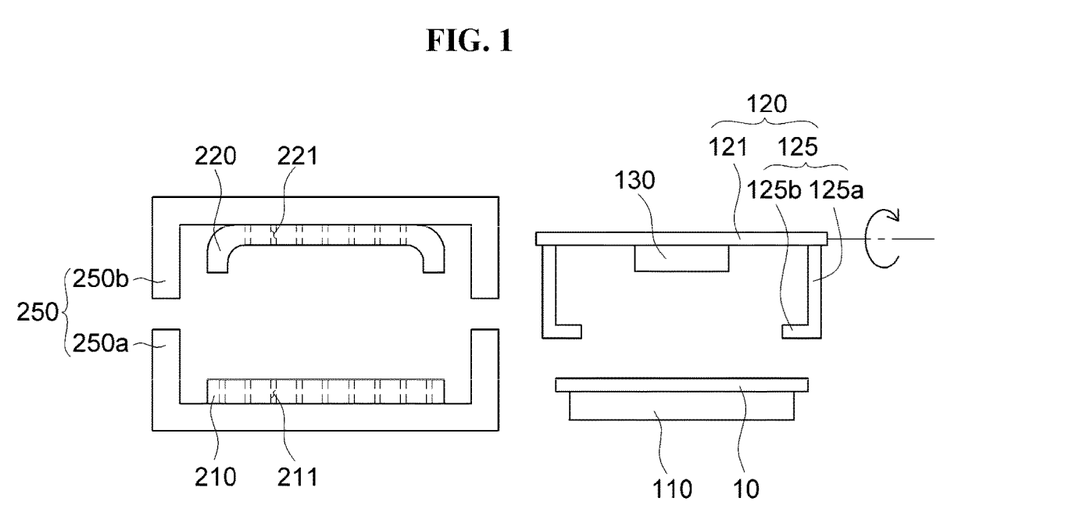
FIG. 1 is a cross-sectional view illustrating an apparatus for attaching substrates according to an exemplary embodiment of the present invention.

FIG. 1 is a cross-sectional view illustrating an apparatus for attaching substrates according to an exemplary embodiment of the present invention.

Referring to FIG. 1, an apparatus for attaching substrates according to an embodiment of the present invention includes a shuttle stage 110, a transferring unit 120, a gas supplier 130, a first main stage 210, a second main stage 220, and a chamber 250.

The shuttle stage 110 may have a planar plate shape. The shuttle stage 110 may support and transfer objects to be processed, e.g., manufacturing, inspection, or the like. The shuttle stage 110 according to an exemplary embodiment of the present invention may support and transfer the substrate 10 for an attachment process. In such a case, the substrate 10 may be any one of a window, a display panel and a functional film constituting the display device. The shuttle stage 110 may transfer the substrate 10 placed on the shuttle stage 110 in a predetermined direction. For example, the shuttle stage 110 may transfer the substrate 10 to a position where each step is performed for the cleaning process, the peeling process, the plasma process, or the like of the substrate 10.

The transferring unit 120 may lift the substrate 10 placed on the shuttle stage 110 or mount the substrate 10 on the shuttle stage 110, and may lift the substrate 10 placed on the shuttle stage 110 and transfer it to the position for the next process. Similarly, the transferring unit 120 may lift the substrate 10 placed on the first main stage 210 or the second main stage 220 to be described below or mount the substrate 10 on the first main stage 210 or the second main stage 220, and may lift the substrate 10 placed on the first main stage 210 or the second main stage 220 and transfer it to the position for the next process The transferring unit 120 includes a support frame 121 and two transferring members 125 positioned at opposing end portions of the support frame 121. In addition, although not illustrated, the transferring unit 120 may further include a driver. The driver may transfer the support frame 121 and the transferring member 125, and adjust the interval between two transferring members 125.

The support frame 121 supports the transferring member 125. The support frame 121 may have a planar plate shape and may be positioned substantially parallel to the shuttle stage 110. However, the inventive concepts are not limited thereto, and the support frame 121 may include a plurality of support bars arranged in parallel with each other.

The two transferring members 125 are positioned opposing each other at opposite end portions of the support frame 121. As illustrated in FIG. 1, each of the transferring members 125 may have an "L" shape in a cross-sectional view. In detail, each of the transferring members 125 includes a vertical bar 125a perpendicular to the support frame 121 and a horizontal bar 125b bent and extending from the vertical bar 125a and opposing the support frame 121. The substrate 10 may be mounted on the horizontal bar 125b of the transferring member 125 and transferred.

The transferring member 125 may linearly move in a direction parallel to the support frame 121. In other words, the two transferring members 125 may move linearly along the directions opposing each other. In addition, the transferring unit 120 according to an embodiment of the present invention may rotate so that the two transferring members 125 are positioned above the support frame 121. Accordingly, the substrate 10 transferred by the transferring unit 120 may be seated not only on an upper surface of the first main stage 210 to be described below but also on a lower surface of the second main stage 220 to be described below.

The gas supplier 130 may spray gas toward the shuttle stage 110, the first main stage 210, or the second main stage 220. In particular, the gas supplier 130 may spray gas toward the substrate 10 located above the shuttle stage 110, the first main stage 210, or the second main stage 220. The gas may be air or nitrogen gas, but exemplary embodiment are not limited thereto.

As the gas supplier 130 sprays gas toward the substrate 10 located above the shuttle stage 110, the direction in which the substrate 10 is curved may be determined. In addition, as the gas supplier 130 sprays the gas toward the substrate 10 located above the first main stage 210 or the second main stage 220, the substrate 10 may be placed on the first main stage 210 or the second main stage 220 in close contact therewith, which will be described in detail later.

The gas supplier 130 according to an exemplary embodiment of the present invention may be integrated with the support frame 121 of the transferring unit 120, thereby being integrally formed into a unitary structure with the transferring unit 120. However, the inventive concepts are not limited thereto, and the gas supplier 130 may be separately formed without being integrated with the transferring unit 120.

The first and second main stages 210 and 220 may support and secure objects to be processed in the chamber 250, such as manufacturing and inspection processes. For example, the first main stage 210 may support and secure the substrate 10 for the attaching process, and the second main stage 220 may support and secure an adherend to which the substrate 10 is to be attached. On the other hand, the second main stage 220 may support and secure the substrate 10 for the attaching process, and the first main stage 210 may support and secure an adherend to which the substrate 10 is to be attached. In such a case, each of the substrate 10 and the adherend may be any one of a window, a display panel and a functional film constituting the display device.

The first main stage 210 may have a planar plate shape. However, the inventive concepts are not limited thereto, and the first main stage 210 may have a convex shape toward the second main stage 220.

The first main stage 210 may secure the substrate 10 or the adherend on the upper surface of the first main stage 210. The first main stage 210 may have a plurality of holes 211 for vacuum-adsorbing the substrate 10 or the adherend. The plurality of holes 211 may be connected to a vacuum unit such as a vacuum pump, and the substrate 10 or the adherend may be vacuum-adsorbed on the upper surface of the first main stage 210 through the plurality of holes 211 connected to the vacuum unit.

The first main stage 210 may move up and down. In addition, although not illustrated, the apparatus for attaching substrates according to an exemplary embodiment of the present invention may further include a pressing pad, an elastic sheet, or the like for pressing the substrate 10 and the adherend.

The second main stage 220 is disposed opposing the first main stage 210. Opposite end portions of the second main stage 220 may have a curved shape. In particular, the second main stage 220 may have a concave shape toward the first main stage 210. However, the inventive concepts are not limited thereto, and the second main stage 220 may have a planar plate shape similar to the first main stage 210.

The second main stage 220 may secure the substrate 10 or the adherend on the lower surface of the second main stage 220 opposing the first main stage 210. The second main stage 220 may have a plurality of holes 221 for vacuum-adsorbing the substrate 10 or the adherend. The plurality of holes 221 may be connected to a vacuum unit such as a vacuum pump, and the substrate 10 or the adherend may be vacuum-adsorbed on the lower surface of the second main stage 220 through the plurality of holes 221 connected to the vacuum unit.

The second main stage 220 may move up and down. In addition, although the second main stage 220 according to an exemplary embodiment of the present invention is described as securing the substrate 10 or the adherend in a vacuum adsorption method, the inventive concepts are not limited thereto, and the substrate 10 or the adherend may be secured in various ways.

The chamber 250 defines a certain space and accommodates the first and second main stages 210 and 220. The chamber 250 according to an exemplary embodiment of the present invention includes a first chamber 250a and a second chamber 250b. The first chamber 250a provides a space in which the first main stage 210 is disposed, and the second chamber 250b provides a space in which the second main stage 220 is disposed.

The first and second chambers 250a and 250b may be spaced apart from each other and may be coupled to each other in close proximity. When the first and second chambers 250a and 250b are spaced apart from each other, the substrate 10 such as a window, a display panel, or a functional film may be drawn into or out of the space between the first and second chambers 250a and 250b. On the other hand, when the first and second chambers 250a and 250b are coupled to each other in close proximity, the spaced defined by the first and second chambers 250a and 250b may be sealed. However, the inventive concepts are not limited thereto, and the chamber 250 may have a single structure having an entrance. In addition, although not illustrated, the apparatus for attaching substrates according to an exemplary embodiment of the present invention may further include a vacuum pump connected to the chamber 250 to adjust the pressure of the space defined by the chamber 250 or to set the vacuum state.

Hereinafter, a method of attaching substrates according to an exemplary embodiment of the present invention will be described with reference to FIGS. 2 to 4.

Figure 2:
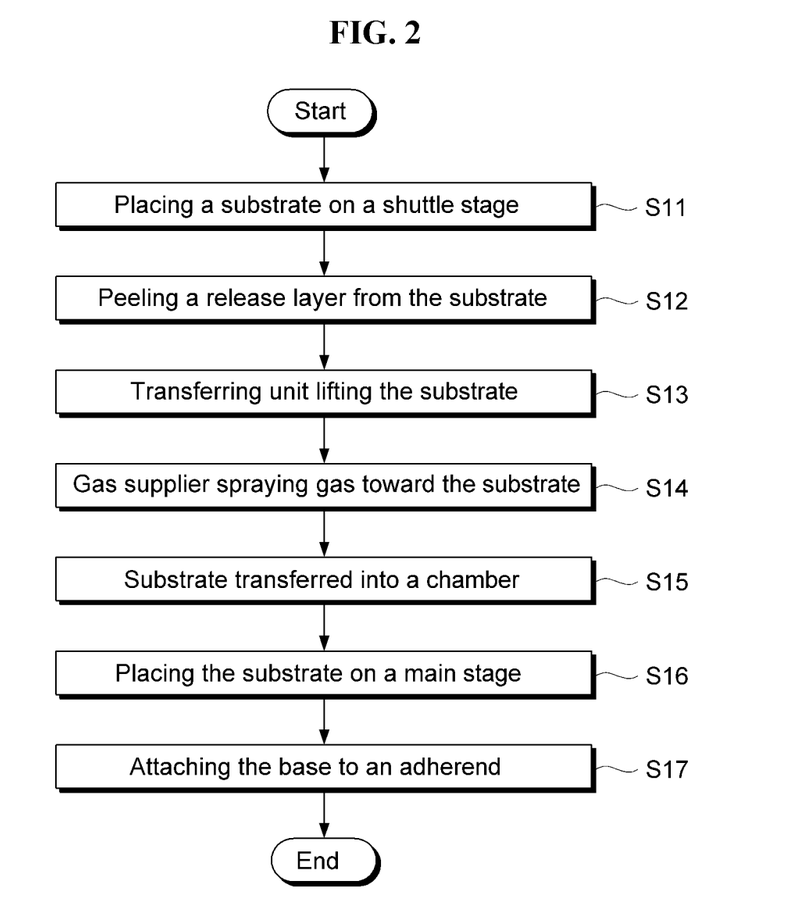
FIG. 2 is a flowchart illustrating a method of attaching substrates according to an exemplary embodiment of the present invention.
Figure 3A:
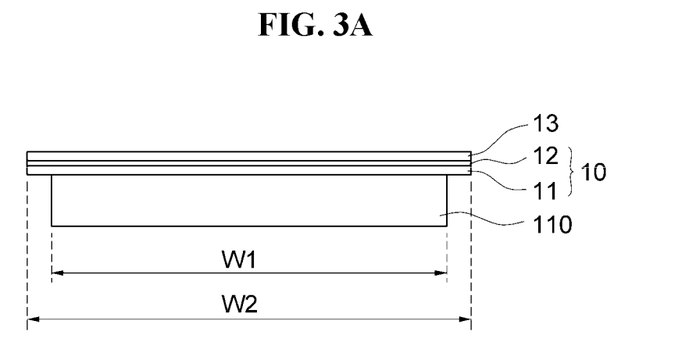
FIG. 3A, FIG. 3B, FIG. 3C, FIG. 3D, FIG. 3E, and FIG. 3F are cross-sectional views illustrating a method of attaching substrates according to an exemplary embodiment of the present invention.
Figure 3B:
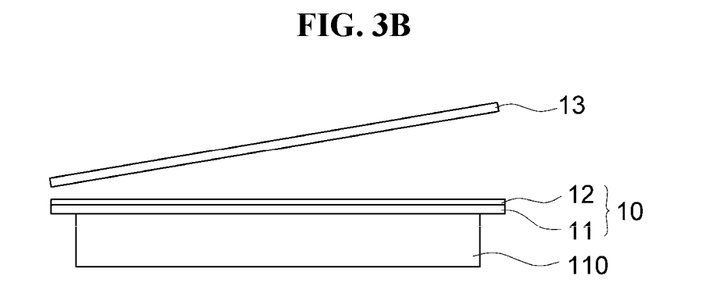
Figure 3C:
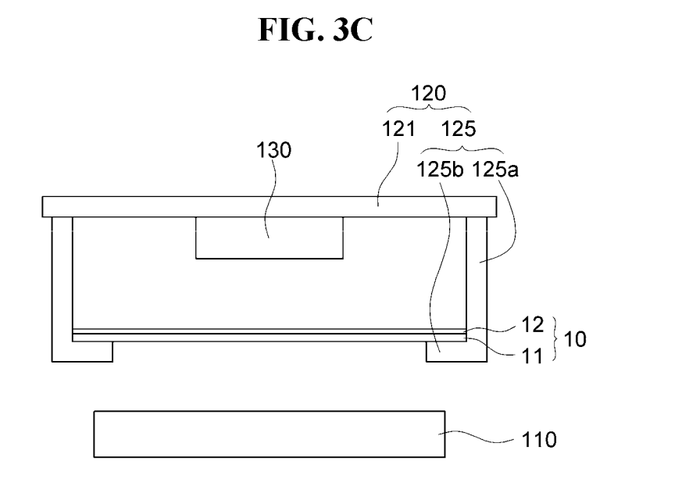
Figure 3D:
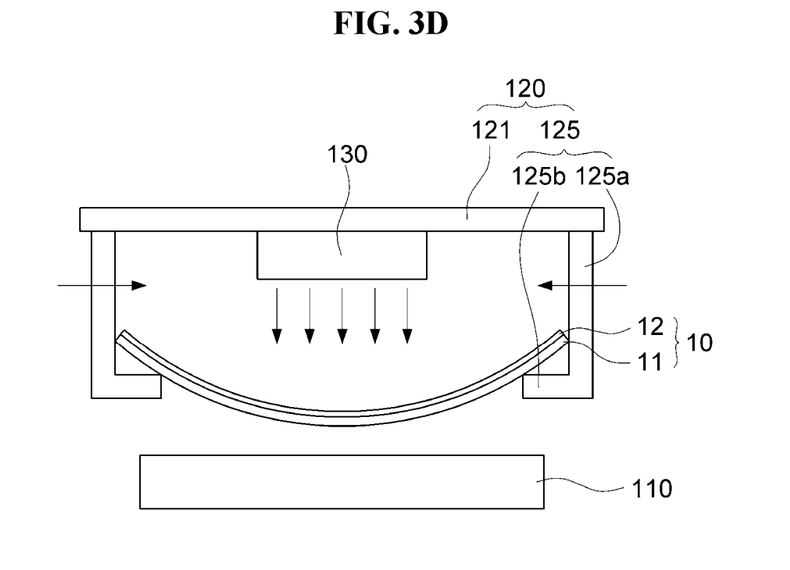
Figure 3E:
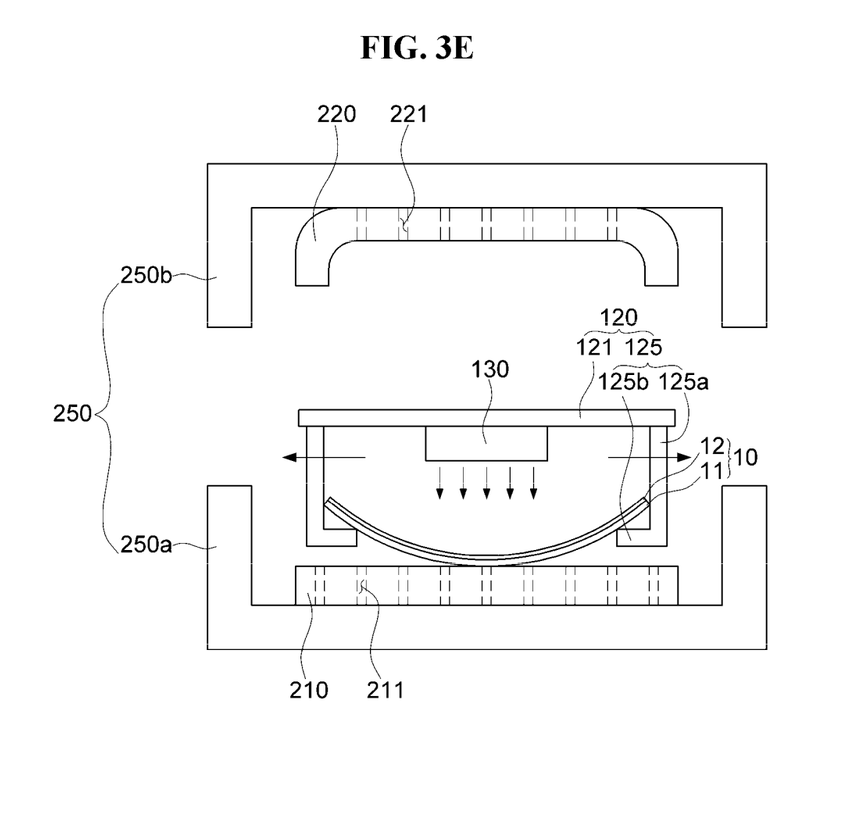
Figure 3F:
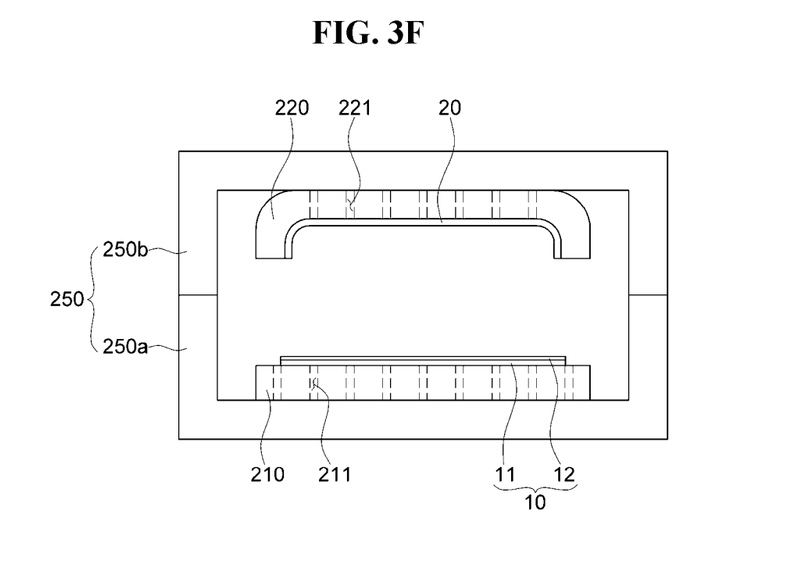
Figure 4:
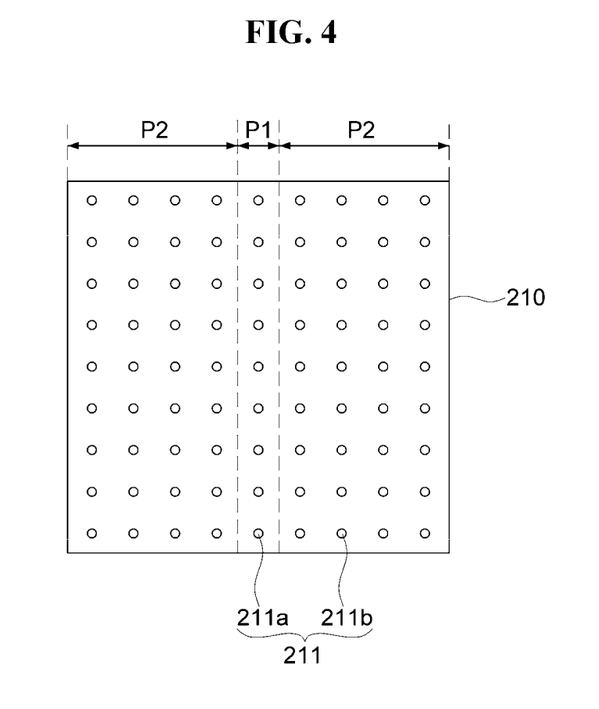
FIG. 4 is a plan view illustrating a first main stage according to an exemplary embodiment of the present invention.

FIG. 2 is a flowchart illustrating a method of attaching substrates according to an exemplary embodiment of the present invention, FIGS. 3A to 3F are cross-sectional views illustrating a method of attaching substrates according to an exemplary embodiment of the present invention, and FIG. 4 is a plan view illustrating a first main stage according to an exemplary embodiment of the present invention.

Referring to FIGS. 2 and 3A, the substrate 10 to which a release film 13 is attached is disposed on the shuttle stage 110 (S11). In such a case, the substrate 10 includes a is base layer 11 and an adhesive layer 12 disposed on one surface of the base layer 11. The substrate 10 may have flexible characteristics. The substrate 10 may be any one of a window, a display panel and a functional film constituting a display device. In particular, the base layer 11 of the substrate 10 may be any one of a window, a display panel and a functional film.

The shuttle stage 110 according to an exemplary embodiment of the present invention may have a width less than that of the substrate 10. For example, as illustrated in FIG. 3A, when the width of the shuttle stage 110 is defined as a first width W1, and the width of the substrate 10 is defined as a second width W2, the first width W1 may be less than the second width W2. The substrate 10 on the shuttle stage 110 is lifted by the transferring unit 120 in the subsequent process. As the opposite end portions of the substrate 10 are positioned outer than the opposite end portions of the shuttle stage 110, the substrate 10 on the shuttle stage 110 may be easily lifted by the transferring unit 120.

The adhesive layer 12 may be attached to or coated on one surface of the base layer 11 in advance so that the substrate 10 is attached to the adherend. The adhesive layer 12 may be at least one of known adhesives such as an acrylic adhesive, a silicone adhesive, and an acid-free type hydroxyl-containing adhesive.

A thickness of the adhesive layer 12 is not particularly limited and may be appropriately selected in consideration of the kind of the substrate, the purpose of use, or the like. For example, the adhesive layer 12 according to an exemplary embodiment of the present invention may have a thickness in the range from about 0.5 μm to about 50 μm, and preferably, in the range from about 5 μm to about 40 μm. When the thickness of the adhesive layer 12 is less than about 0.5 µm, it may be difficult to obtain the adhesive layer 12 having a uniform thickness or the adhesion may be relatively low. When the thickness of the adhesive layer 12 is exceeds about 50 µm, the overall thickness of the substrate 10 may be increased.

The release film 13 protects the substrate 10 from dust, debris, moisture and other contaminants until the substrate 10 is used during the process. In general, the release film 13 is attached to the adhesive layer 12 of the substrate 10, and is detached from the adhesive layer 12 immediately before use.

For example, a polyethylene film, a polypropylene film, an ethylene vinyl acetate copolymer film, a polyvinyl chloride film, a polyvinylidene chloride film, a polystyrene film, a polycarbonate film, a polyamide film, a polyethylene terephthalate film, a polyvinyl alcohol film, a polyurethane film, a polytetrafluoroethylene film, an acrylic film, or the like, or a mixture or laminated film of two or more kinds thereof may be used as the release film 13, but the inventive concepts are not limited thereto. In addition, the release film 13 may be release-processed by alkyd type, silicone type, fluorine type, unsaturated ester type, polyolefin type, wax type silicon powder or the like.

A thickness of the release film 13 is not particularly limited and may be appropriately selected in consideration of the kind of the substrate, the purpose of use, or the like. For example, the release film 13 according to an exemplary embodiment of the present invention may have a thickness in the range from about 10 µm to about 400 µm, and preferably, in the range from about 10 µm to about 150 µm.

Next, referring to FIGS. 2 and 3B, the release film 13 is peeled from the substrate 10 (S12). For example, the release film 13 may be peeled off from the substrate 10 using a peeling tape. In addition, the release film 13 may be peeled off from the substrate 10 by using a peeling unit including a peeling roller, a gripper or an adsorption machine. In addition, the release film 13 may be peeled directly from the substrate 10 by the user.

Foreign substances such as dust and debris may be generated during peeling the release film 13 from the substrate 10. When the peeling process is performed after transferring the substrate 10 with the release film 13 into the chamber 250, foreign matter may float in the chamber 250 or the foreign matter may be attached to the components accommodated in the chamber 250. The foreign matter in the chamber 250 may reduce the adhesion between the substrate 10 and the adherend, and thus the reliability and display quality of the display device may be degraded. On the other hand, according to an exemplary embodiment of the present invention, by performing the peeling process before transferring the substrate 10 into the chamber 250, the foreign matter may be substantially prevented from floating in the chamber 250 or from being attached to the components accommodated in the chamber 250. Accordingly, the reliability and display quality of the display device may be improved.

In addition, according to an exemplary embodiment of the present invention, a cleaning process may be performed before the release film 13 is peeled off from the substrate 10. As described above, when the peeling process is performed after cleaning the substrate 10 to which the release film 13 is attached, generation of foreign matter, such as dust and debris, may be substantially minimized during peeling off the release film 13 from the substrate 10.

In addition, according to an exemplary embodiment of the present invention, after the release film 13 is peeled from the substrate 10, a plasma process may be performed. As described above, when the plasma process is performed on the substrate 10 from which the release film 13 has been peeled off, the adhesion of the adhesive layer 12 may be improved.

Next, referring to FIGS. 2 and 3C, the transferring unit 120 lifts the substrate 10 from the shuttle stage 110 (S13). In such a case, the support frame 121 of the transferring unit 120 may move up and down, and the two transferring members 125 may move linearly in directions opposing each other. As described above, as the shuttle stage 110 has a width less than that of the substrate 10, and the opposite end portions of the substrate 10 are positioned outer than the opposite end portions of the shuttle stage 110, the substrate 10 on the shuttle stage 110 may be easily lifted by the transferring unit 120.

The transferring unit 120 does not contact an upper surface of the substrate 10. In specific, the transferring member 125 of the transferring unit 120 directly contacts only a lower surface and a side surface of the substrate 10, and does not contact the upper surface of the substrate 10 on which the adhesive layer 12 is located. The adhesive layer 12 of the substrate 10 from which the release film 13 has been removed is exposed to the outside. The transferring unit 120 according to an exemplary embodiment of the present invention does not contact the upper surface of the adhesive layer 12 so as to substantially prevent the adhesive layer 12 from being contaminated due to the contact between the transferring unit 120 and the adhesive layer 12 exposed to the outside.

Next, referring to FIGS. 2 and 3D, the two transferring members 125 linearly move in directions of approaching each other, and the gas supplier 130 sprays gas toward the substrate 10 (S14). Accordingly, the substrate 10 having the flexible characteristics is curved convexly in the direction away from the gas supplier 130. The gas may be air or nitrogen gas, but the inventive concepts are not limited thereto.

In specific, the two transferring members 125 move linearly in the directions of approaching each other, thereby inducing warpage of the substrate 10. Particularly, when the distance between the vertical portions 125a of the two transferring members 125 becomes less than the width of the substrate 10, the substrate 10 may be curved convexly or concavely in the direction away from the gas supplier 130. In such a case, the gas supplier 130 according to an is exemplary embodiment of the present invention causes the substrate 10 to be convexly curved in the direction away from the gas supplier 130 by spraying gas toward the substrate 10.

Next, as illustrated in FIGS. 2 and 3E, the curved substrate 10 is transferred into the chamber 250 by the transferring unit 120 (S15), and the substrate 10 transferred into the chamber 250 is placed on the first main stage 210 (S16). In such a case, the first chamber 250a and the second chamber 250b are spaced apart from each other, so that the transferring unit 120, the gas supplier 250a, and the substrate 10 may enter the space between the first chamber 250a and the second chamber 250b.

When the substrate 10 transferred into the chamber 250 is placed on the first main stage 210, the substrate 10 sequentially contacts the first main stage 210 from a center portion of the substrate 10 to an end portion of the substrate 10. In detail, when the support frame 121 of the transferring unit 120 moves so as to be close to the first main stage 210, the substrate 10 transferred in a curved state contacts the upper surface of the first main stage 210 from the center portion of the substrate 10. Then, the two transferring members 125 move linearly in directions away from each other. Accordingly, the substrate 10 may be sequentially placed on the first main stage 210 from the center portion of the substrate 10 to the end portion of the substrate 10.

In such a case, the gas supplier 130 may spray gas toward the substrate 10. This makes it possible to substantially prevent the formation of air bubbles between the first main stage 210 and the substrate 10, and contact between the first main stage 210 and the substrate 10 may be improved. The gas may be air or nitrogen gas, but the inventive concepts are not limited thereto.

When the substrate 10 transferred into the chamber 250 is placed on the first main stage 210, the substrate 10 may be sequentially vacuum-absorbed onto the upper surface of the first main stage 210 from the center portion of the substrate 10 to the end portion of the substrate 10. The first main stage 210 according to an exemplary embodiment of the present invention has the plurality of holes 211 for vacuum-adsorbing the substrate 10, and the plurality of holes 211 may be connected to a vacuum unit, such as a vacuum pump. The substrate 10 may be first vacuum-adsorbed by the holes 211 corresponding to a center portion of the substrate 10 among the plurality of holes 211 of the first main stage 210, and then vacuum-adsorbed by the holes 211 corresponding to the area between the center portion and an edge portion of the substrate 10 among the plurality of holes 211.

In particular, referring to FIG. 4, the first main stage 210 may include a center portion P1 and a peripheral portion P2 between the center portion P1 and the edge. The center portion P1 may be defined as a line-shaped region crossing the center of the first main stage 210. The peripheral portion P2 may be defined as a region other than the center portion P1, and may be defined as two regions apart from each other with the center portion therebetween. However, the inventive concepts are not limited thereto, and the center portion P1 and the peripheral portion P2 may be arranged as a plurality of regions arranged in various other ways.

The plurality of holes 211 of the first main stage 210 include a plurality of first holes 211a located at the center portion P1 and a plurality of second holes 211b located at the peripheral portion P2. Although the plurality of holes 211 are depicted as being located in parallel to each other in the vertical direction or in the horizontal direction, the inventive concepts are not limited thereto. The plurality of holes 211 may be alternately located with each adjacent one of the holes 211 in the vertical direction or in the horizontal direction, or may be located in a zigzag form.

Referring to FIGS. 3E and 4, when the support frame 121 of the transferring unit 120 moves so as to be close to the first main stage 210, the substrate 10 transferred in a curved state contacts the upper surface of the first main stage 210 from the center portion of the substrate 10. In particular, the center portion of the substrate 10 may contact the plurality of first holes 211a located at the center portion P1 of the first main stage 210. In such a case, the vacuum unit connected to the plurality of first holes 211a operates, so that the center portion of the substrate 10 may be vacuum-adsorbed onto the first main stage 210.

Next, the two transferring members 125 move linearly in directions away from each other. At this time, the vacuum unit connected to the plurality of second holes 211b operates, and the substrate 10 may be sequentially vacuum-adsorbed onto the first main stage 210 from the center portion of the substrate 10 to the edge portion of the substrate 10. This makes it possible to substantially prevent the formation of air bubbles between the first main stage 210 and the substrate 10, and contact between the first main stage 210 and the substrate 10 may be improved.

Next, as illustrated in FIG. 3F, an adherend 20 to which the substrate 10 is to be attached is placed on the lower surface of the second main stage 220. The adherend 20 may be any one of a window, a display panel, and a functional film constituting the display device. The adherend 20 may have flexible characteristics, but embodiments are not limited thereto. The adherend 20 may be fastened to the second main stage 220 through the same process as in the process in which the substrate 10 is secured, or may be fastened to the second main stage 220 through a different process. According to an exemplary embodiment of the present invention, although it is described that the substrate 10 is disposed on the upper surface of the first main stage 210 and the adherend 20 is disposed on the lower surface of the second main stage 220, embodiments are not limited thereto. The substrate 10 may be disposed on the lower surface of the second main stage 220, and the adherend 20 may be disposed on the upper surface of the first main stage 210.

Next, referring to FIGS. 2 and 3f, the transferring unit 120 and the gas supplier 130 move out of the chamber 250 through the space between the first chamber 250a and the second chamber 250b, and the first chamber 250a and the second chamber 250b are coupled in close proximity to each other. When the space defined by the first and second chambers 250a and 250b is sealed, the attaching process of attaching the substrate 10 to the adherend 20 is performed (S17).

For example, at least one of the first and second main stages 210 and 220 moves up and down, and the substrate 10 and the adherend 20 may contact each other. In such a case, pressure may be applied to the substrate 10 and the adherend 20 so that the substrate 10 and the adherend 20 may be attached to each other. Although not illustrated, the apparatus for attaching substrates according to an embodiment of the present invention may further include a pressing pad, an elastic sheet, or the like for pressing the substrate 10 and the adherend 20. However, the inventive concepts are not limited thereto, and the substrate 10 may be attached to the adherend 20 in various ways.

In the method of attaching substrates according to an exemplary embodiment of the present invention, the cleaning process, the peeling process, the plasma process, or the like of the substrate 10 is not performed in the chamber 250, but the substrate 10 finished with the cleaning process, the peeling process, and the plasma process is transferred into the chamber 250 to perform the attaching process thereon, and thus, the size of the process equipment including the chamber 250 may be reduced.

In addition, the process of bringing the equipment for performing the cleaning process, the peeling process, and the plasma process in the chamber 250 may be omitted, and thus the process time may be reduced.

In addition, by performing the peeling process of the release film 13 before transferring the substrate 10 into the chamber 250, foreign matter may be substantially prevented from floating in the chamber 250 or from being attached to the components accommodated in the chamber 250. Accordingly, the reliability and display quality of the display device may be improved.

Hereinafter, another exemplary embodiment of the present invention will be described with reference to FIG. 5. The description of the same configuration as that of a previous exemplary embodiment of the present invention will be omitted for the convenience of explanation.

Figure 5:
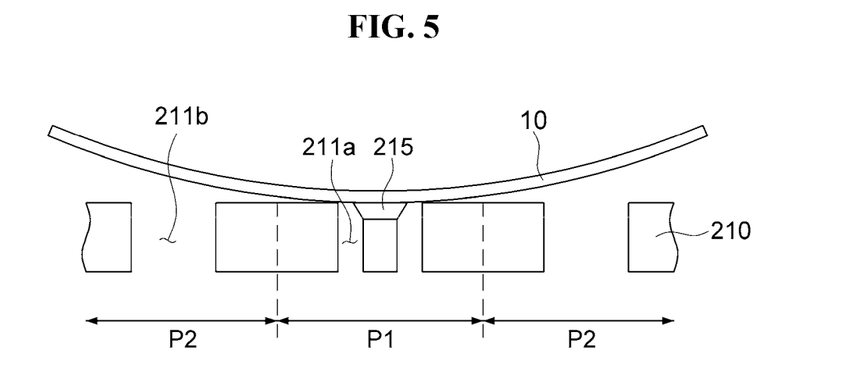
FIG. 5 is a cross-sectional view illustrating a first main stage, an adsorption pad, and a substrate according to another exemplary embodiment of the present invention.

FIG. 5 is a cross-sectional view illustrating a first main stage, an adsorption pad, and a substrate according to another exemplary embodiment of the present invention.

Referring to FIG. 5, an apparatus for attaching substrates according to another exemplary embodiment of the present invention further includes an adsorption pad 215 located at at least one of the plurality of first holes 211a of the first main stage 210. The absorption pad 215 may be located in each of the plurality of first holes 211a or may be located in at least part of the plurality of first holes 211a.

The absorption pad 215 may move up and down in the first hole 211a. The adsorption pad 215 may adsorb the center portion of the substrate 10 to secure the center portion of the substrate 10 first. That is, the adsorption pad 215 may adsorb and secure the center portion of the substrate 10 before the substrate 10 is completely placed on the first main stage 210.

After the center portion of the substrate 10 is secured first, the vacuum unit connected to the plurality of second holes 211b operates as in an exemplary embodiment of the present invention, and the substrate 10 may be sequentially vacuum-absorbed onto the first main stage 210 from the center portion of the substrate 10 to the end portion of the substrate 10. This makes it possible to substantially prevent the formation of air bubbles between the first main stage 210 and the substrate 10, and contact between the first main stage 210 and the substrate 10 may be improved. The gas may be air or nitrogen gas, but the inventive concepts are not limited thereto.

Hereinafter, still another exemplary embodiment of the present invention will be described with reference to FIG. 6. The description of the same configuration as that of a previous exemplary embodiment of the present invention will be omitted for the convenience of explanation.

Figure 6:
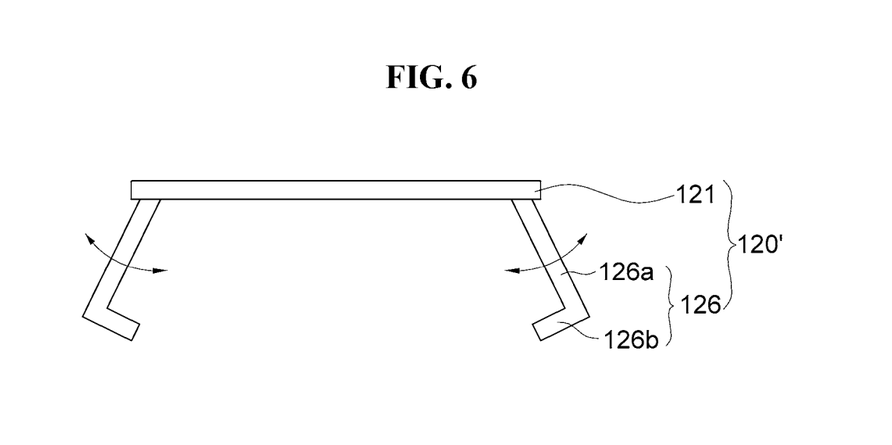
FIG. 6 is a cross-sectional view illustrating a transferring unit according to still another exemplary embodiment of the present invention.

FIG. 6 is a cross-sectional view illustrating a transferring unit according to still another exemplary embodiment of the present invention.

Referring to FIG. 6, a transferring unit 120' according to still another exemplary embodiment of the present invention includes a support frame 121 and two transferring members 126 which may rotate by a predetermined angle with respect to the support frame 121. In other words, dissimilar to the two transferring members 126 according to an exemplary embodiment of the present invention that move linearly in the directions opposing each other, the two transferring members 126 according to still another exemplary embodiment of the present invention may rotate by a predetermined angle with respect to a contact point with the support frame 121.

Each of the transferring members 126 may have an "L" shape on a cross-sectional view. Similar to a previously-described exemplary embodiment of the present invention, each of the transferring members 126 includes a vertical bar 126a and a horizontal bar 126b. The substrate 10 may be placed on the horizontal bar 126b of the transferring member 126 and be transferred.

For example, the horizontal bars 126b of the two transferring members 126 may rotate in directions of approaching each other, thereby inducing the substrate 10 to be lifted or to be warped. On the other hand, the horizontal bars 126b of the two transferring members 126 may rotate in directions away from each other, so that the substrate 10 may be mounted on the shuttle stage 110, the first main stage 210 or the second main stage 220.

Hereinafter, still another exemplary embodiment of the present invention will be described with reference to FIG. 7. The description of the same configuration as that of a previous exemplary embodiment of the present invention will be omitted for the convenience of explanation.

Figure 7:
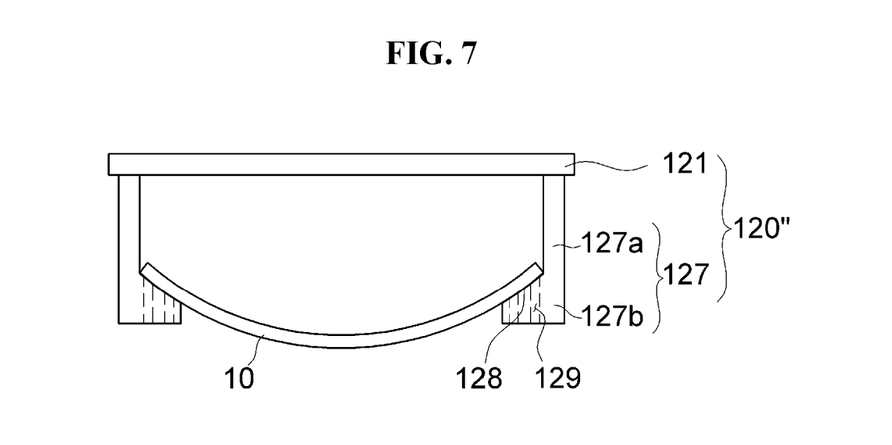
FIG. 7 is a cross-sectional view illustrating a transferring unit according to still another exemplary embodiment of the present invention.

FIG. 7 is a cross-sectional view illustrating a transferring unit according to still another exemplary embodiment of the present invention.

Referring to FIG. 7, a transferring unit 120" according to still another exemplary embodiment of the present invention includes a support frame 121 and two transferring members 127, and each of the two transferring members 127 includes a vertical bar 127a and a horizontal bar 127b having an inclined surface 128.

In detail, each of the transferring members 127 includes the vertical bar 127a perpendicular to the support frame 121, and the horizontal bar 127b bent and extending from the vertical bar 127a and having the inclined surface 128 opposing the support frame 121. In such an embodiment, the inclined surface 128 of the horizontal bar 127b may be a planar surface or a curved surface.

The substrate 10 is mounted on the horizontal bar 127b of the transferring member 127 and be transferred. According to still another exemplary embodiment of the present invention, as an upper surface of the horizontal bar 127b opposing the support frame 121 is inclined, the substrate 10 may be more stably mounted on the horizontal bar 127b and be transferred.

In addition, the horizontal bar 127b of the transferring member 127 according to still another exemplary embodiment of the present invention may have a plurality of holes 129 for vacuum-adsorbing the substrate 10. The plurality of holes 129 may be connected to a vacuum unit such as a vacuum pump, and the substrate 10 may be vacuum-adsorbed onto an upper surface of the horizontal bar 127b through the plurality of holes 129 connected to the vacuum unit. Accordingly, the substrate 10 may be more stably mounted on the horizontal bar 127b and be transferred.

As set forth hereinabove, according to one or more exemplary embodiments of the present invention, the method of attaching substrates and the apparatus for attaching substrates may enable stable and precise attachment, and accordingly, the reliability and display quality of the display device may be improved.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of attaching substrates, the method comprising:
   placing a substrate, attached with a release film, on a shuttle stage;
   peeling the release film from the substrate;
   lifting the substrate from the shuttle stage by a transferring unit;
   spraying gas toward the substrate by a gas supplier so that the substrate is convexly curved in a direction away from the gas supplier;
   transferring the substrate into a chamber by the transferring unit;
   placing the substrate on a main stage in the chamber; and
   attaching the substrate to an adherend.

2. The method of claim 1, wherein:
   the substrate comprises a base layer and an adhesive layer; and the transferring unit does not contact an upper surface of the adhesive layer.

3. The method of claim 1, wherein, in transferring the substrate into the chamber by the transferring unit, the substrate is transferred in a curved state.

4. The method of claim 1, wherein, in placing the substrate on the main stage in the chamber, the substrate contacts the stage sequentially from a center portion of the substrate to an edge portion of the substrate.

5. The method of claim 1, wherein, in placing the substrate on the main stage in the chamber, the gas supplier sprays gas toward the substrate.

6. The method of claim 1, wherein, in placing the substrate on the main stage in the chamber, the substrate is vacuum-adsorbed to the main stage through at least one hole defined in the main stage.

7. The method of claim 1, wherein:
the main stage comprises a center portion and a peripheral portion between the center portion and an edge; and
the main stage has a plurality of first holes located at the center portion and a plurality of second holes located at the peripheral portion.

8. The method of claim 7, wherein, in placing the substrate on the main stage in the chamber, the substrate is vacuum-adsorbed through the plurality of first holes, and then vacuum-adsorbed through the plurality of second holes.

9. The method of claim 7, wherein, in placing the substrate on the main stage in the chamber, the substrate is secured by an adsorption pad located at the first hole, and then vacuum-adsorbed through the plurality of second holes.

10. The method of claim 1, wherein the transferring unit comprises two transferring members disposed apart from each other with the substrate interposed therebetween.

11. The method of claim 10, wherein, in spraying gas toward the substrate so that the substrate is convexly curved in the direction away from the gas supplier, the two transferring members move in directions of approaching each other.

12. The method of claim 10, wherein, in placing the substrate on the main stage in the chamber, the two transferring members move in directions away from each other.

13. The method of claim 10, wherein, in transferring the substrate into the chamber by the transferring unit, the substrate is vacuum-adsorbed to the transferring member through at least one hole defined in the transferring member.

14. The method of claim 10, wherein:
the transferring unit further comprises a support frame connected to the two transferring members; and
each of the two transferring members has an inclined surface opposing the support frame.

15. The method of claim 1, further comprising performing a plasma process on the substrate, after peeling the release film from the substrate and before the lifting the substrate from the shuttle stage.

16. The method of claim 1, further comprising cleaning the substrate to which the release film is attached before peeling the release film from the substrate.

17. An apparatus for attaching substrates comprising:
a shuttle stage configured to support and transfer a substrate;
a main stage located in a chamber;
a transferring unit configured to transfer the substrate from the shuttle stage to the main stage; and
a gas supplier disposed apart from the shuttle stage with the substrate interposed therebetween, the gas supplier configured to spray gas toward the substrate.

18. The apparatus of claim 17, wherein:
the substrate comprises a base layer and an adhesive layer; and
the transferring unit does not contact an upper surface of the adhesive layer.

19. The apparatus of claim 17, wherein:
the transferring unit comprises a support frame and two transferring members, the two transferring members connected to the support frame and opposing each other; and
each of the two transferring members has an inclined surface opposing the support frame.

20. The apparatus of claim 19, wherein each of the two transferring members has a plurality of holes.

21. The apparatus of claim 17, wherein the gas supplier and the transferring unit are integrally formed into a unitary structure.

22. The apparatus of claim 17, wherein the gas supplier is disposed apart from the main stage with the substrate interposed therebetween, and is configured to spray gas toward the substrate.

23. The apparatus of claim 17, wherein the main stage has a plurality of holes.

24. The apparatus of claim 23, further comprising an adsorption pad located at at least one of the plurality of holes.

* * * * *